United States Patent
Kasai et al.

(10) Patent No.: US 7,204,271 B2
(45) Date of Patent: Apr. 17, 2007

(54) ELECTRICALLY OPERATED SWITCH-OVER VALVE

(75) Inventors: Akira Kasai, Saitama (JP); Masahiro Murata, Saitama (JP); Yasumasa Takada, Saitama (JP); Morio Kaneko, Saitama (JP); Takashi Hirakawa, Saitama (JP); Kaori Yokota, Saitama (JP)

(73) Assignee: Kabushiki Kaisha Saginomiya Seisakusho, Tokyo (JP)

( * ) Notice: Subject to any disclaimer, the term of this patent is extended or adjusted under 35 U.S.C. 154(b) by 1 day.

(21) Appl. No.: 10/545,712

(22) PCT Filed: Feb. 14, 2004

(86) PCT No.: PCT/JP2004/001527

§ 371 (c)(1),
(2), (4) Date: Aug. 12, 2005

(87) PCT Pub. No.: WO2004/072521

PCT Pub. Date: Aug. 26, 2004

(65) Prior Publication Data
US 2006/0070671 A1    Apr. 6, 2006

(30) Foreign Application Priority Data
Feb. 14, 2003    (JP) .............................. 2003-037315

(51) Int. Cl.
*F16K 11/06* (2006.01)

(52) U.S. Cl. .............................................. 137/625.46
(58) Field of Classification Search ........... 137/625.41, 137/625.46
See application file for complete search history.

(56) References Cited

U.S. PATENT DOCUMENTS

| | | | | |
|---|---|---|---|---|
| 4,653,538 A | * | 3/1987 | Tsutsui et al. | 137/625.46 |
| 4,823,841 A | * | 4/1989 | Graber | 137/625.41 |
| 5,095,934 A | * | 3/1992 | Iqbal | 137/625.41 |
| 5,325,887 A | * | 7/1994 | Egli et al. | 137/270 |
| 5,504,950 A | * | 4/1996 | Natalizia et al. | 137/625.41 |
| 5,806,552 A | * | 9/1998 | Martin, Jr. | 137/625.41 |

FOREIGN PATENT DOCUMENTS

| | | |
|---|---|---|
| JP | 11-248021 | 9/1999 |
| JP | 2002-71035 | 3/2000 |
| JP | 2002-13843 | 1/2002 |
| JP | 2002-81559 | 2/2002 |
| JP | 2002-71035 | 3/2002 |
| JP | 2002-147897 | 5/2002 |
| JP | 2002-349744 | 12/2002 |

* cited by examiner

*Primary Examiner*—John Fox
(74) *Attorney, Agent, or Firm*—Reising, Ethington, Barnes, Kisselle, P.C.

(57) ABSTRACT

A bottom wall 11 of a valve chamber 13 of an electric switching valve 10 includes a laminated structure having a bottom cover 11 to which pipe fittings 14, 15, 16 are connected; a valve seat 19 on which the valve ports 19C, 19D are opened and which an end wall of the valve body 20 slidably contacts; an intermediate plate 17 interposed between the bottom cover 11 and the valve seat 19 with communication openings 17D, 17E for connecting the pipe fittings 15, 16 to the valve ports 19C, 19D. At least one of the valve ports 19C, 19D is biased toward a rotation center of the valve body 20 against the center of the corresponding pipe fitting 15, 16.

3 Claims, 10 Drawing Sheets

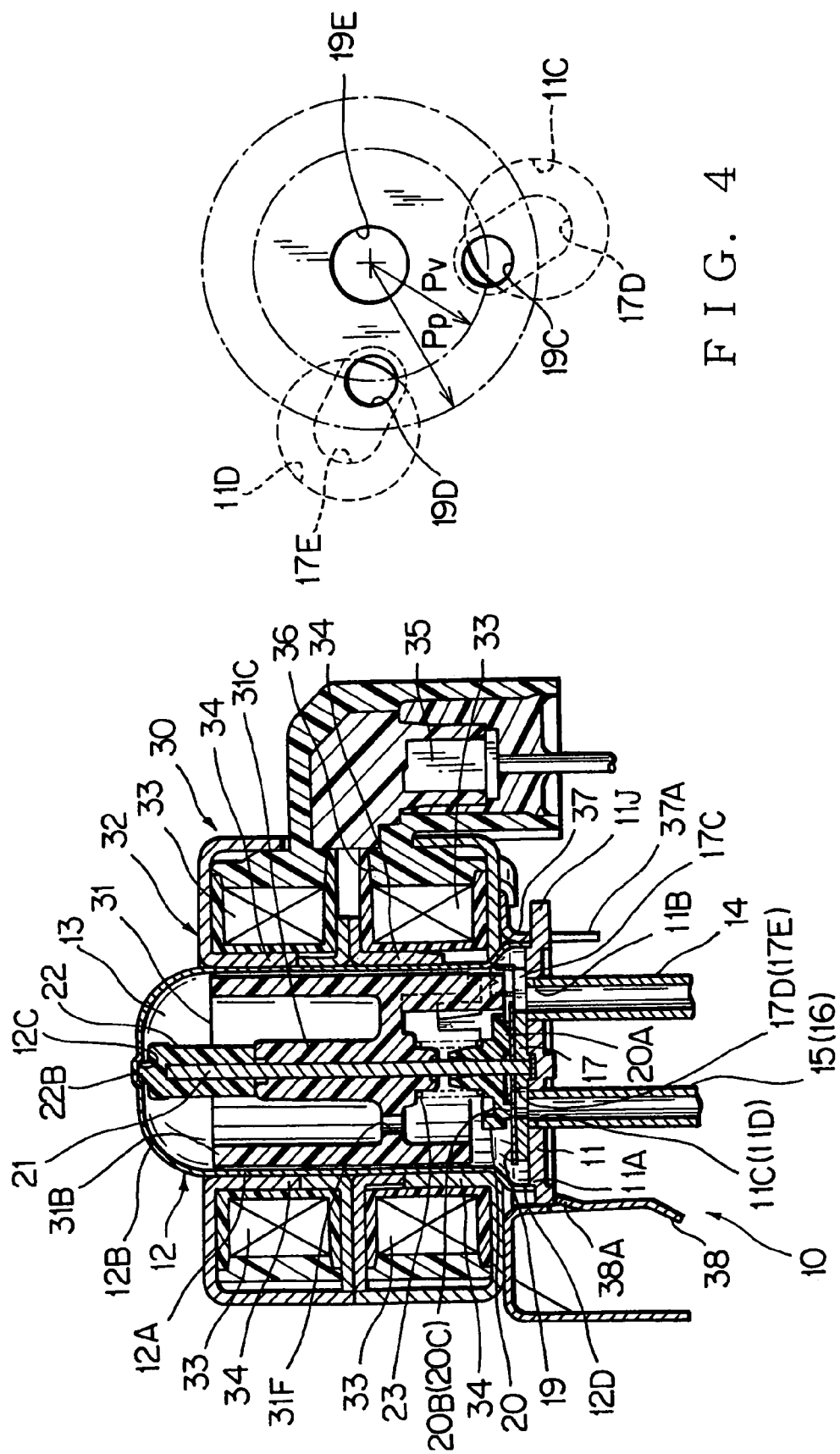

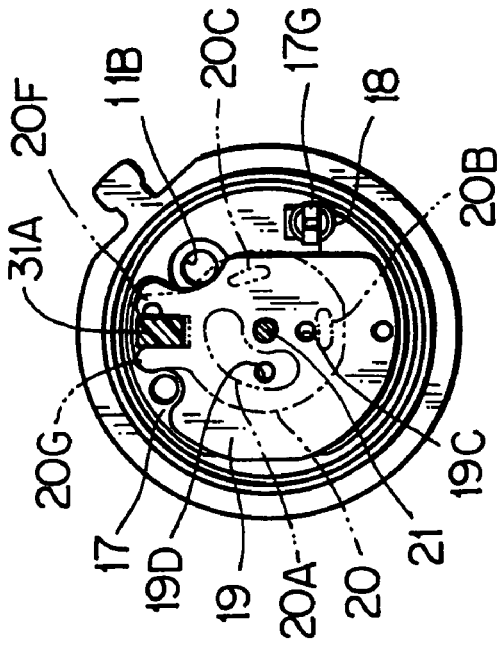
FIG. 2B 18 PULSES (A→B)
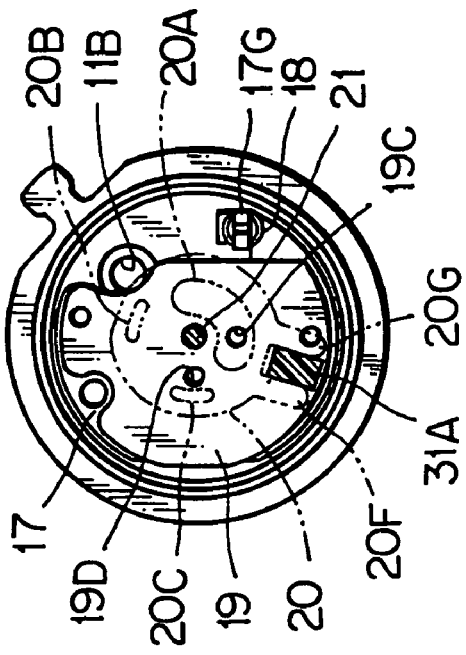
FIG. 2D 54 PULSES (A→C)
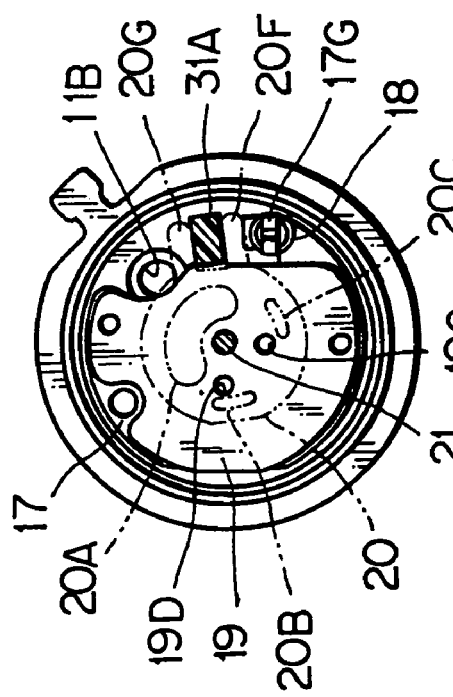
FIG. 2A 0 PULSE (A→B&C)
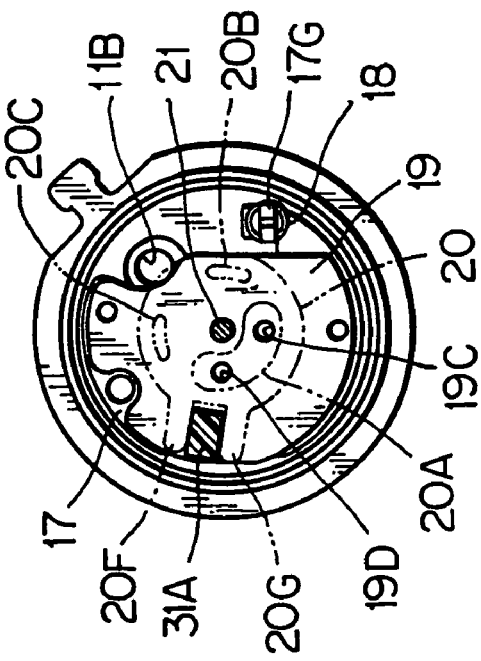
FIG. 2C 36 PULSES (CLOSED)

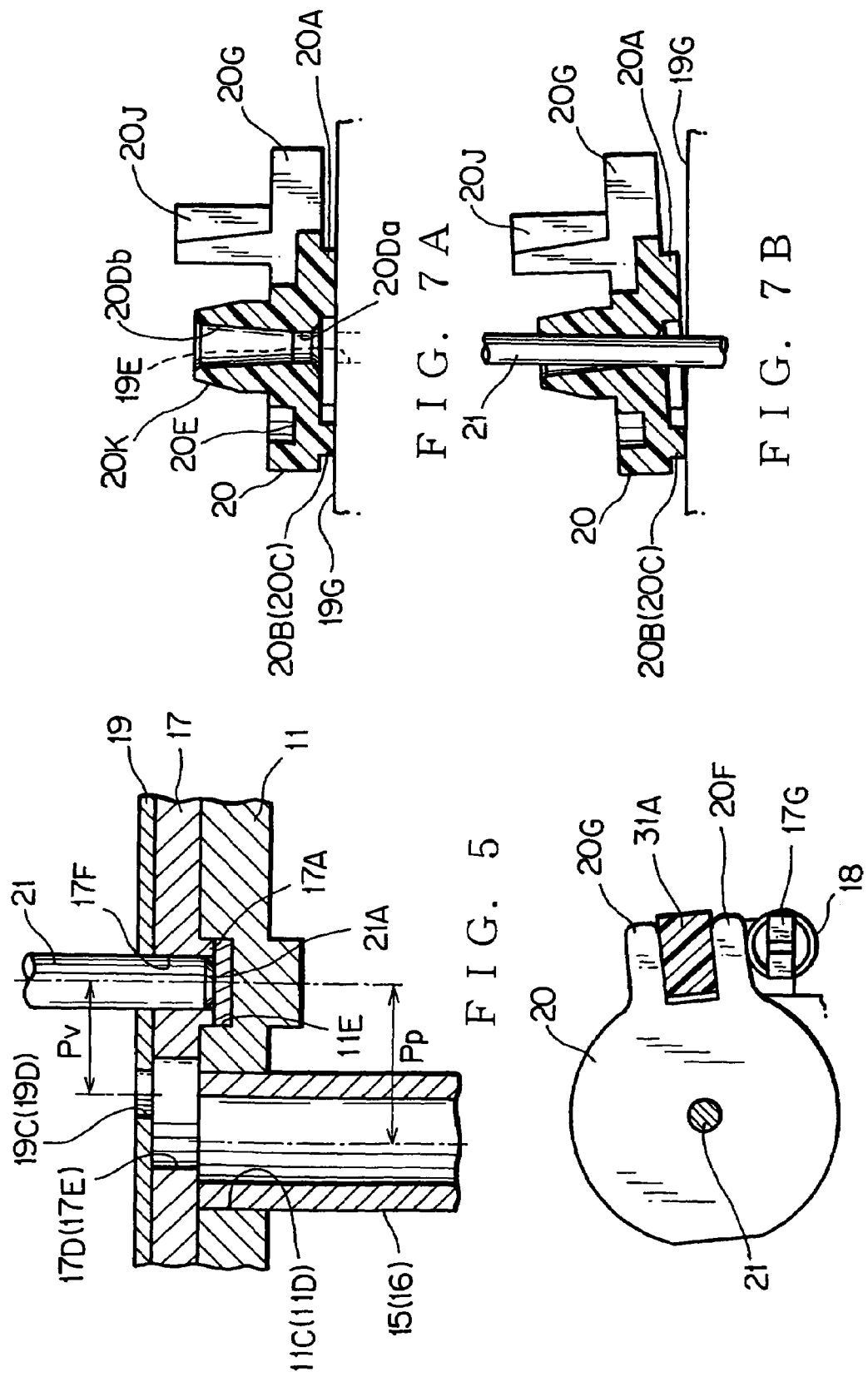

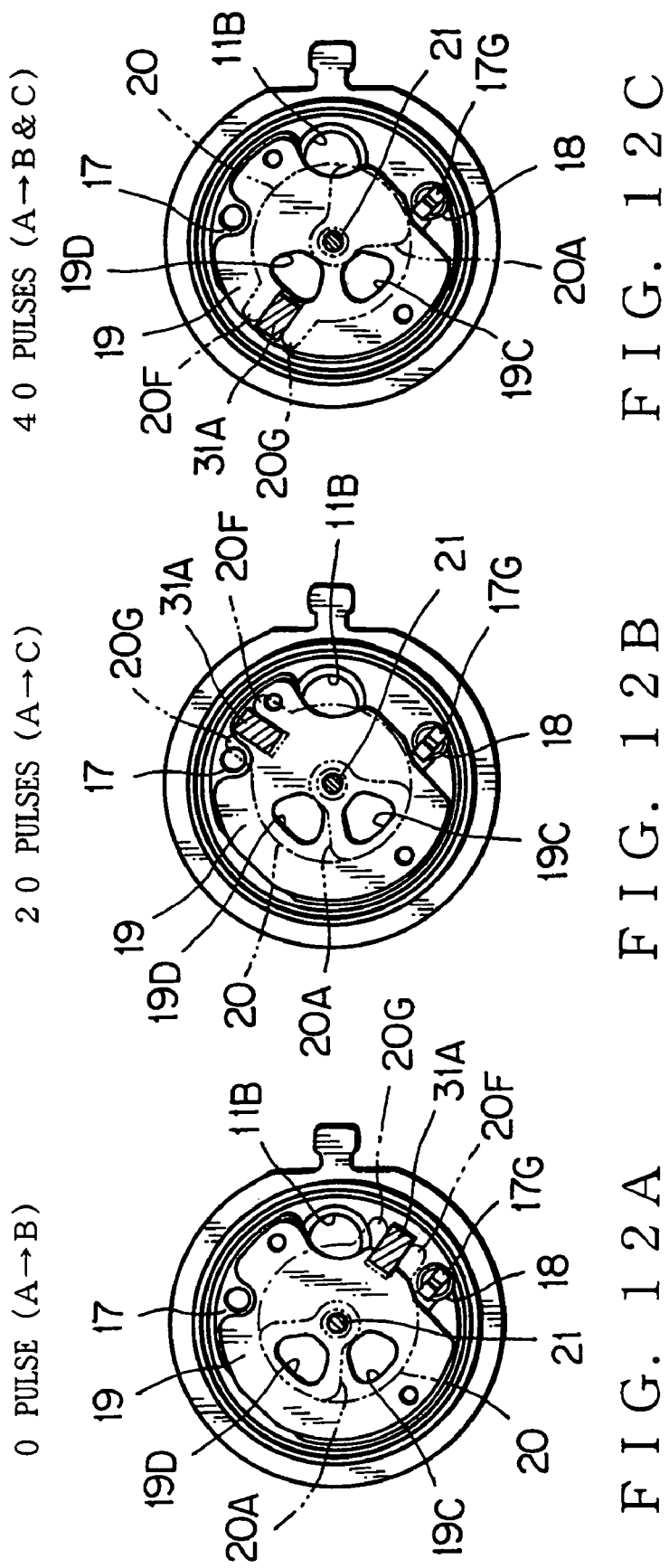

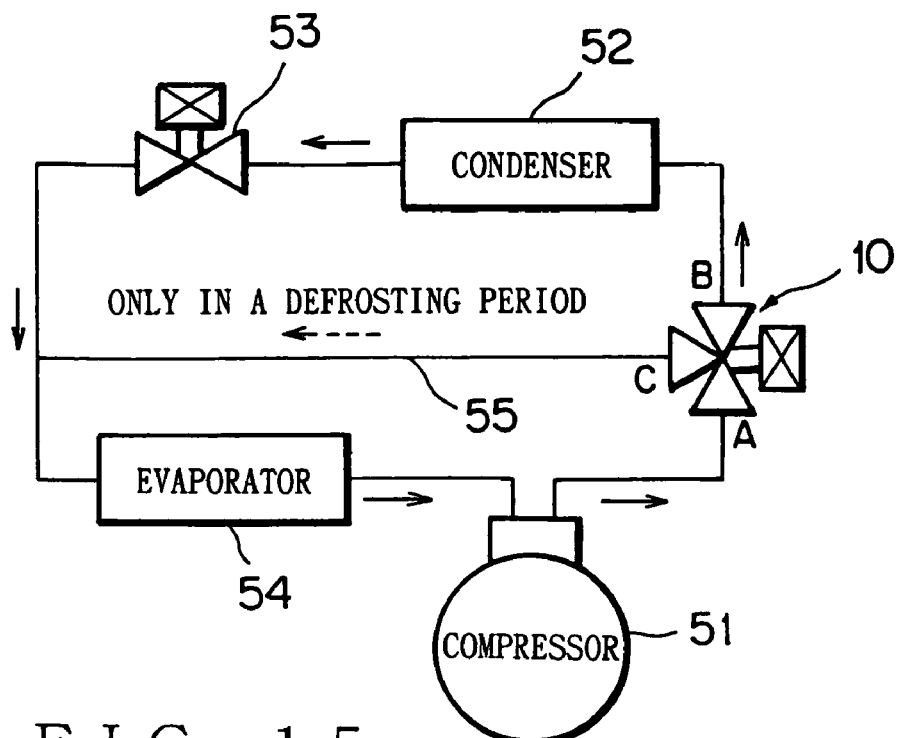
F I G. 1 5
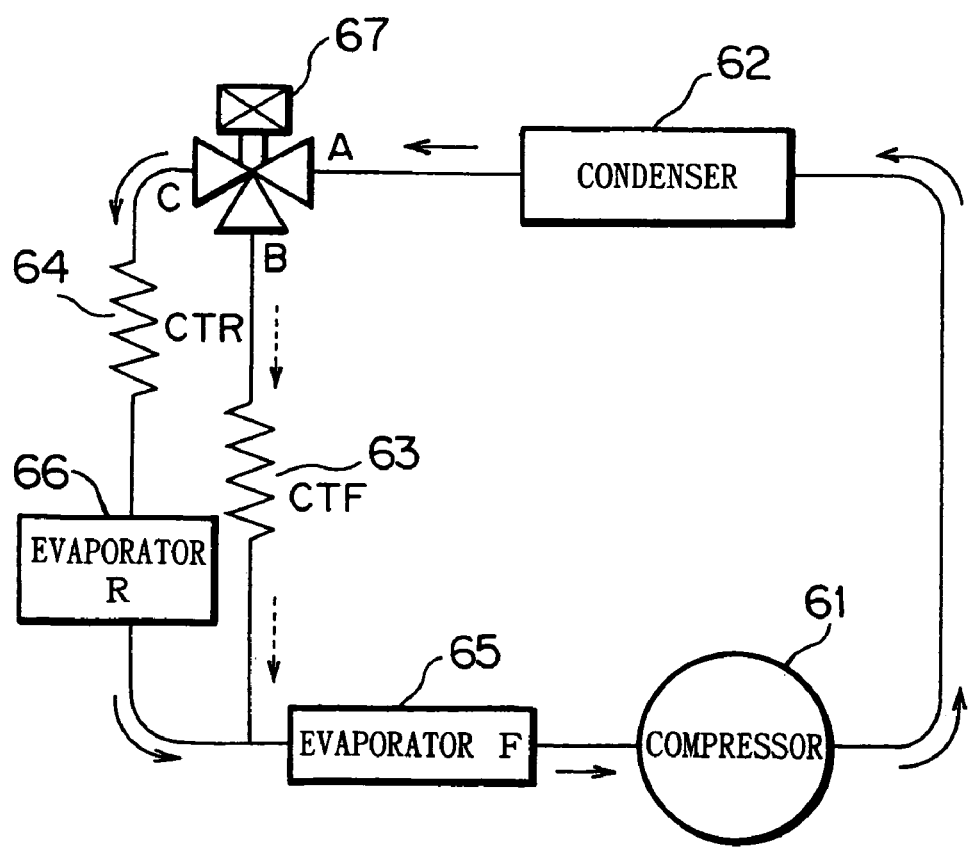
F I G. 1 6

_US 7,204,271 B2_

ELECTRICALLY OPERATED SWITCH-OVER VALVE

REFERENCE TO RELATED APPLICATIONS

This application claims the benefit of Japanese Patent Application No. 2003-037315 filed on Feb. 14, 2003, and to Japanese PCT Application No. PCT/JP2004/001527 filed on Feb. 14, 2004.

TECHNICAL FIELD

This invention relates to an electric switching valve, particularly, a direct acting electric switching valve used for switching flow paths between a refrigerant of a freezer, a refrigerator, or the like.

BACKGROUND ART

As an electric direction control valve for changing a flow path of a refrigerant of a freezer or a refrigerator, a direct acting electric switching valve is known as disclosed in JP-A, H11-13925; JP-A, 2001-156493; JP-A, 2001-156494; and JP-A, 2002-122366. This direct acting electric switching valve includes a plurality of valve ports opened on a flat bottom wall of a valve chamber; a valve body disposed rotatably in the valve chamber, slidably contacting the bottom wall of the valve chamber with an edge thereof and switching connections between the valve ports corresponding to rotational positions thereof; and a stepping motor for directly rotating the valve body.

In the direct acting electric switching valve, a pitch circle radius of the valve ports is so small as to reduce a driving torque of the valve body. Accordingly, a small radius of the valve body is preferable. However, owing to an arrangement of pipe fittings connected to the valve ports limits the pitch circle radius of the valve ports. For overcoming this limitation, it is conceivable that positions of the valve ports are biased toward the rotational center of the valve body against centers of the pipe fittings so as to reduce the pitch circle radius of the valve ports corresponding to an amount of the bias.

However, the conventional electric switching valve has such a structure that the valve ports are formed on one side of a bottom part of the valve chamber, and the pipe fittings are connected to the other side of the bottom part. Therefore, the possible mount of the biasing is limited, and the amount of the biasing cannot be adjusted to a proper value or a required value with high design flexibility.

DISCLOSURE OF THE INVENTION

The present invention is invented for solving the above problems and an object of the present invention is to provide an electric switching valve allowing an amount of biasing of valve ports against pipe fittings in a radial direction of a valve body to be adjusted to a proper value or a required value with high design flexibility, and having a high-flatness valve seat without leakage through the valve.

In order to attain the object, according to the present invention as claimed in claim 1, there is provided an electric switching valve, including:

a valve chamber having a plurality of valve ports opened on a flat bottom wall thereof;

a valve body disposed rotatably in the valve chamber, slidably contacting the bottom wall of the valve chamber at an end wall thereof, and switching connections between the valve ports corresponding to a rotational position thereof; and an electric actuator for rotating the valve body, wherein the bottom wall of the valve chamber has a laminated structure having a bottom cover to which pipe fittings are connected; a valve seat on which the valve ports are opened and to which the valve body slidably contacts at an end wall thereof; an intermediate plate having communication openings, for connecting the pipe fittings to the valve ports, interposed between the bottom cover and the valve seat, wherein at least one of the valve ports is biased in a radial direction of the rotating valve body against the center of the corresponding pipe fitting.

BRIEF DESCRIPTION OF THE DRAWINGS

FIG. 1 is a sectional view showing a first embodiment of an electric switching valve according to the present invention;

FIGS. 2A to 2D show respective switching positions of the electric 10 switching valve in the first embodiment;

FIG. 4 is an enlarged plan view showing a positional relationship between through holes and valve ports of the electric switching valve in the first 15 embodiment;

FIG. 5 is an enlarged sectional view showing a positional relationship between through holes and valve ports of the electric switching valve in the first embodiment;

FIG. 6 is an enlarged plan view showing a stopper for detecting a base point of the electric switching valve in the first embodiment;

FIG. 7A is an enlarged sectional view showing a valve body of the electric switching valve in the first embodiment;

FIG. 7B is an enlarged sectional view showing an oscillating action of the valve body of the electric switching valve in the first embodiment;

FIGS. 12A to 12C show respective switching positions of the electric 10 switching valve in the second embodiment;

FIG. 15 is a schematic refrigerant circuit diagram showing one example using the electric switching valve according to the present invention; and FIG. 16 is a schematic refrigerant circuit diagram showing another example using the electric switching valve according to the present invention.

BEST MODE FOR CARRYING OUT THE INVENTION

Specific Constitution of a First Preferred Embodiment of an Electric Switching Valve According to the Present Invention First, a constitution of a first embodiment of an electric switching valve according to the present invention will be explained with reference to FIGS. 1 to 7.

As shown in FIG. 1, an electric switching valve 10 includes a circular bottom cover 11 as a fixing member, a can-shaped case 12 hermetically sealed on the bottom cover 11. The case 12 cooperates with the bottom cover 11 to form a hermetically sealed valve chamber 13 therein.

Figure 3:
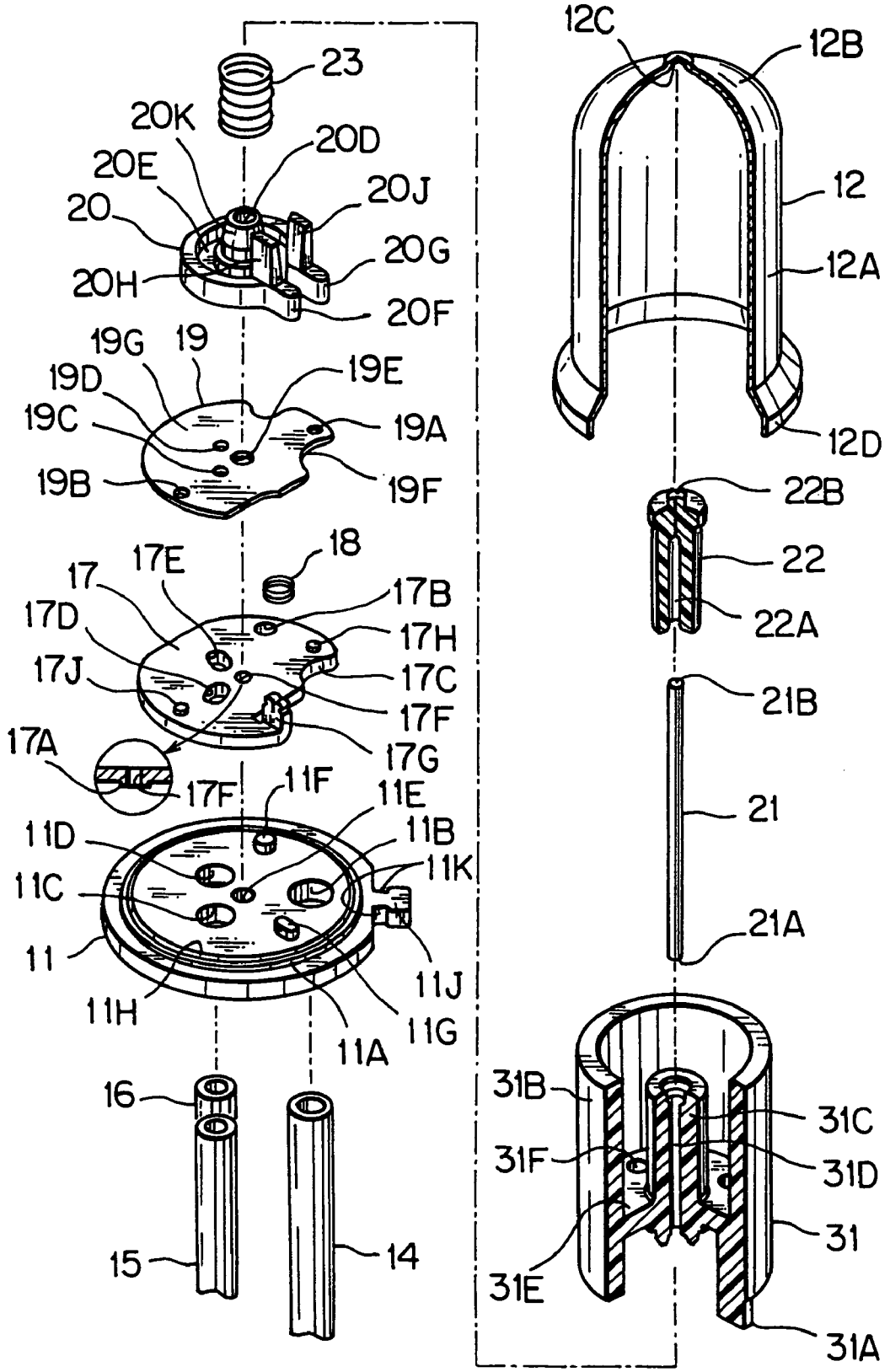
FIG. 3 is an exploded perspective view showing a main part of the electric switching valve in the first embodiment.

The case 12 is formed by deeply drawing a thin stainless steel plate. As shown in FIG. 3, a rotor receiving cylinder 12A and an upper dome 12B of the case 12 are integrally press-molded for reliably forming a bearing-engaging recess 12C on the center of the upper dome 12B for attaining reliably concentricity with the rotor receiving cylinder 12A. When a part of the upper dome 12B in the vicinity of the rotor receiving cylinder 12A is compared to a sphere, the upper dome 12B is so formed that a curvature radius (R) of the sphere is slightly smaller than an outside radius (2/D) of the rotor receiving cylinder 12A, namely, R=(D/2)–a. This design is aimed at an improvement of inner pressure resistance. To be more precise, this design ensures a required pressure resistance under a condition that a vertical size of the case is not larger than a required size thereof, and the upper dome 12B is moderately curved.

A diameter of a lower opening 12D of the case 12 connected to the bottom cover 11 is formed larger than an outer diameter (D) of the rotor-receiving cylinder 12A so as to provide a margin in inner components design, to care the pressure resistance, and to buffer a thermal influence when connecting them.

The bottom cover 11 is formed by press-molding and stamping a stainless steel plate. A step 11 A, of which our diameter is substantially the same as an inner diameter of the lower opening 12D, is formed on an upper wall of the bottom cover 11. The lower opening l2D is fitted into the step 11A (see FIG. 1). This fitting ensures concentricity between the bottom cover 11 and the case 12.

The bottom cover 11 and the case 12 are welded (laser-welded) at the fitting part between the step 11A and the lower opening 12D. This reduces the thermal influence of the welding, prevents spattering material from dispersing to the valve chamber 13, and prevents brazing material from flowing to the welded part.

Through holes 11B, 11C, 11D, having brazing margins for inserting pipe fittings are formed by stamping on (three) main parts of the bottom cover 11. The through holes 11C, 11D are disposed on the same arc concentric with a center axis of the electric switching valve, and separated from each other at a specific angle (90 degrees). One ends of pipe fittings 14, 15, 16 are respectively inserted into the through holes 11B, 11C, 11D. The pipe fittings 14, 15,16 are fixed to the bottom cover 11 and an intermediate plate 17, both of which are integrated with each other by a connection described later, by respectively brazing with brazing rings, and extended outward (downward) from the bottom cover.

Considering an environment, preferably, the brazing is carried out through the same process as that of the later described intermediate plate 17, that is, a furnace brazing process without flux in such as a hydrogen reduction atmosphere furnace.

In addition, a U-shaped ring groove 11H, of which diameter is slightly smaller than that of the step 11A, is formed on the upper wall of the bottom cover 11 so as to prevent the brazing material, used for brazing the pipe fittings 14, 15, 16 and the intermediate plate 17, from flowing to a welding interface between the bottom cover 11 and the case 12.

The intermediate plate (base plate) 17 is fixed on the upper wall of the bottom cover 11 by brazing. The intermediate plate 17 is formed by pressing, bending, and stamping a stainless steel plate. A shaft-supporting hole 17F is formed on the center of the intermediate plate 17 by stamping. When the shaft-supporting hole 17 is stamped, a circular recess 17A is formed on a lower wall of the 17 by a burring process. This circular recess 17A is fitted into a center recess 11E embossed on the center of the bottom cover 11. Further, a locating hole 17B is stamped on the intermediate plate 17 so as to be fitted into a locating projection 11F embossed on the bottom cover 11. The intermediate plate 17 and the bottom cover 11 are aligned concentrically by fitting at these two locations.

A center recess 11E on the bottom cover 11 is deep enough to work as a reservoir (see FIG. 5) and prevent the brazing material from flowing toward the shaft-supporting hole 17F. Further, the center recess 11E also works as a clearance for variations of length of a later-described center shaft 21.

A notch 17C, through which the through-hole (inlet port) 11B communicates with the valve chamber 13, is formed on the intermediate plate 17. Oblong communication openings 17D, 17E respectively communicating with through-holes (outlet port) 11C, 11D are formed on the intermediate plate 17. The communication openings 17D, 17E respectively extend in a radial direction of the intermediate plate 17, and communicate with the through-holes 11C, 11D at an outer side thereof in the radial direction. Incidentally, hereinafter through-holes 11A, 11C, 11D are respectively also referred to as ports A, B, C.

A lower end 21A of the later-described center shaft 21 is fitted into the shaft-supporting hole 17F formed by stamping the center of the intermediate plate 17 (see FIG. 5). A diameter of the shaft-supporting hole 17F is smaller than the circular recess 17A, and large enough to have a required clearance against the center shaft 21.

A stopper 17G to be touched by a projection 20F of a later-described valve body 20 for detecting a base point is formed by bending a part of the intermediate plate 17. A buffer coil spring 18 is attached to the stopper 17G to surround the stopper 17G. The buffer coil spring 18 is made of a resilient stainless steel small-gage wire and wound tightly in an ordinary coil shape.

Further, an upper end of the stopper 17G is swaged for preventing the buffer coil spring 18 from falling out. Further, a projection 11G is embossed on the upper wall of the bottom cover 11. A top of the projection 11G contacts the bottom of the buffer coil spring 18 attached to the stopper 17G and prevents the buffer coil spring 18 from leaning.

A valve seat (valve seat member) 19 is attached to the upper wall of the intermediate plate 17. The valve seat 19 is formed by a thin stainless plate, both sides of which are etched into a specific shape. A carefully selected barrel finishing is achieved on the valve seat 19 for purposes to increase surface smoothness of the sliding valve seat plane (valve seat plane 19G) for attaining a good sliding lubricity of the valve body 20, and to remove an edge burr in the both-sides etching process.

Locating holes 19A, 19B for respectively fitting into two locating projections 17H, 17J embossed on the intermediate plate 17, valve ports 19C, 19D for respectively communicating with the communication openings 17D, 17E, and a center hole 19E, through which the center shaft 21 penetrates, are formed by etching the valve seat 19. Owing to these formed by etching, followings are reliably achieved at row cost: to increase design flexibility of the valve seat 19; to design a different shape of the valve seat 19 easily; to increase accuracy of sizes of components and smoothness of the valve seat 19; to decrease surface roughness, and leakage is decreased.

A location and an angle of the valve seat 19 is corrected by the locating holes 19A, 19B respectively fitting with the locating projections 17H, 17J of the intermediate plate 17. Various methods such as adhesive sealing material, brazing, soldering, thermocompression bonding, and welding can be used for connecting the valve seat 19 to the intermediate plate 17.

Epoxy resin, polyamide-imide, polyester, polyester-imide, and polyurethane are suitable as the adhesive sealing material regarding resistivity to refrigerant. Either a batch furnace or a continuous furnaces can be used for curing the adhesive sealing material. A heat curing adhesive such as epoxy resin is cured by heating at about 120 degree.

Like the notch 17C of the intermediate plate 17, a notch 19F, through which the through-hole (inlet port) 11B communicates with the valve chamber 13, is farmed on the valve seat 19.

As shown in FIG. 4, the valve ports 19C, 19D are disposed on the same arc concentric with the center axis of the center hole 19E through which the center shaft 21 penetrates, and separated from each other at a specific angle (90 degrees). A pitch circle radius Pv of the valve ports 19C, 19D is smaller than a pitch circle radius Pp of the through holes 11C, 11D. The valve ports 19C, 19D respectively communicate with inner sides of the communication openings 17D, 17E in a radial direction of the intermediate plate 17. Incidentally, the pitch circle radius Pp of the through holes IIC, 11D is the same as that Pp of the pipe fittings 15, 16 shown in FIG. 5.

When summarizing a bottom structure of the valve chamber 13, as shown better in FIG. 5, the bottom of the valve chamber 13 is formed by a laminated structure with three layers having the bottom cover 11 to which the pipe fittings 14, 15, 16 are connected; the valve seat 19 on which the valve ports 19C, 19D are opened and which the edge of the valve body 20 slidably contacts; and the intermediate plate 17 caught between the bottom cover 11 and the valve seat 19 and having communication openings 17D, 17E connecting the pipe fittings 15, 16 to the valve ports 19C, 19D.

The valve ports 19C, 19D are biased toward the rotational center of the valve body 20 against the centers of corresponding pipe fittings 15, 16. The intermediate plate 17 having communication openings 17D, 17E extending in the radial direction thereof connects the valve ports 19C, 19D to the pipe fittings 15, 16.

The valve seat plane 19G is an upper wall of the valve seat 19 in the valve chamber 13, and the valve body 20 is disposed on the valve seat plane 19G. The valve body 20 is integrally molded and made of synthetic resin having slidability and resistivity to refrigerant. As shown in FIGS. 7A and 7B, a plane valve 20A in an arc shape for opening and closing two valve ports 19C, 19D at a specific rotation angle, and two legs 20B, 20C for striking a balance to stabilize a sealing load are respectively projected from a bottom wall of the valve body 20. The plane valve 20A is formed corresponding to the pitch circle radius Pv of the valve ports 19C, 19D. As shown in FIG. 2, the two legs 20A, 20B are separately projected from the bottom wall of the valve body 20 on the same arc concentric with a center axis of a center hole 20D in the center of the valve body 20 into which the center shaft 21 penetrates rotatably.

As shown in FIG. 7A, the plane valve 20A and the legs 20B, 20C of the valve body 20 slidably contacts the valve seat plane 19G of the valve seat 19. Incidentally, as shown in FIG. 3, a concaved thin part 20E is formed on an upper wall of the valve body 20, of which bottom wall is the plane valve 20A, for a purpose of preventing a shrinkage influence of the resin molding and a degradation of the surface flatness and smoothness of the plane valve 20A.

The valve body 20 rotates around the center axis guided by the center shaft 21 penetrating through the center hole 20D. As shown better in FIGS. 7A, 7B, the, center hole 20D includes a straight hole (having a small clearance) 2ODa for ensuring the concentricity with the center shaft 21, and an upper tapered hole 20Db.

The upper tapered hole 20Db works as a configuration for improving assembling workability of the center shaft 21, and as an oscillating mechanism to accommodate the variations of balance and angle between the valve seat 19 and the valve body 20 against the center shaft 21, so that sealing ability and operation stability of the switching valve are improved. Further, this oscillating reduces a valve locking risk of the valve body 20 by catching dust.

As shown in FIG. 3, two projections 20F, 20G projecting outward in the radial direction of the valve body 20 are formed integrally on the valve body 20 in a circular direction thereof in a manner that a space is formed between the projections 20F, 20G. As shown in FIG. 6, by engaging a projection 31A formed on a rotor 31 of a stepping motor 30 with the space between two projections 20F, 20G, the valve body 20 is connected to the rotor 31 for receiving torque at an initial position in the circular direction thereof. Resultingly, the valve body 20 is synchronously rotated with the rotor 31.

The projection 20F also works as a stopper of the rotor 31. As shown in FIGS. 2A and 6, by a rotation of the rotor 31 in a clockwise direction (CW), the projection 20F touches the buffer coil spring 18 of the stopper 17G to detect the base point.

Since the buffer coil spring 18 buffers an impact of a collision upon detecting the base point, collision sound is decreased. Since being metallic, the buffer coil spring 18 is not influenced by the refrigerant or freezer oil. Therefore, for example, the buffer coil spring 18 is more durable than rubber elastic material (rubber stopper) such as O-rings.

Further, guiding pieces 20H, 20J are formed on the projections 20F, 20G to guide the projection 31A to a space between the projections 20F, 20G when mounting the rotor 31 on the valve body 20. In other words, the guiding pieces 20H, 20J prevent the projection 31A from falling out from the space between the projections 20F, 20G. In addition, as shown in FIG. 3, the valve body 20 includes a tapered guiding shaft 20K for guiding a later-described pressure spring 23.

The center shaft 21 is made of polished stainless steel, and rotatably supported by fitting a bottom end 21A thereof into the shaft-supporting hole 17F of the intermediate plate 17 (see FIG. 5). A top end 21B of the center shaft 21 is rotatably fitted into a bearing hole 22A of a bearing 22. The bearing 22 is made of high lubricating material. A top center projection 22B of the bearing 22 is engaged with the bearing-engaging recess 12C of the case 12 (see FIG. 1).

As shown in FIG. 1, the rotor 31 of the stepping motor 30 is rotatably mounted in an interior of the valve chamber 13. The valve chamber 13 is a plastic magnet of which outer periphery 31B is multipolar magnetized. As described above, the projection 31A connects the rotor 31 to the valve body 20 for conveying the torque to rotate the valve body 20.

As shown in FIG. 3, a through hole 31D, which the center shaft 21 penetrates, is drilled on a boss 31C of the rotor 31, and a pressure-equalizing communicating hole 31F is drilled on a rib 31E connecting the outer periphery 31B and the boss 31C. For preventing the rotor 31 from rotational shaking (inclination), a length of the through hole. 31D in an axial direction is made as long as possible. At least one of the pressure-equalizing communicating holes 31F is needed. The pressure-equalizing communicating hole 31F not only works for balancing upper and lower pressure of the rotor 31, but also works for preventing the freezer oil or the refrigerant from depositing on the upper side of the rotor 31.

The pressure spring 23 made of a compression coil spring is caught between a bottom end of the boss 31C of the rotor 31 and the upper wall of the valve body 20. The pressure spring 23 secures stability of valve sealing under low differential pressure by pressing the plane valve 20A of the valve body 20 against the valve seat plane 19G. At the same time, the pressure spring 23 urges the rotor 31 and the bearing 22 upward and presses the top center projection 22B of the bearing 22 against the bearing-engaging recess 12C of the case 12.

As shown in FIG. 1, a stator assembly 32 is located and fixed on an outer periphery of the case 12. The stator assembly 32 includes two upper and lower stator coils 33, magnetic teeth 34, an electric connector 35 and the like, and is liquid sealed by sealing resin 36.

The stator assembly 32 is phase matched (locating position in the 25 circular direction) by a fork end 37A of a locating piece 37 formed on the stator assembly 32 catching and engaging with a recess 11K of a locating projection 11J formed on an outer periphery of the bottom cover 11. Further, engaging a reverse checking hook 38A of a fallout stopper 38 formed on the stator assembly 32 with a bottom wall of the bottom cover 11 prevents the stator assembly 32 from falling out.

The valve body 20 is rotated to four switching positions by a divisional rotary driving of the stepping motor 30. As shown in FIG. 2A, in a first switching position (zero pulse=start position), the plane valve 20A is apart from both of the valve ports 19C, 19D, which are opened to the valve chamber 13, and the port A (inlet port) communicates with two outlet ports (ports B, C). As shown in FIG. 2B, in the second switching position (eighteen pulses), the plane valve 20A shuts the valve port 19D, only the valve port 19C is opened to the valve chamber 13, and the port A (inlet port) communicates with only the port B. As shown in FIG. 2C, in the third switching position (thirty-six pulses), the plane valve 20A shuts both the ports 19C and 19D, and the port A (inlet port) communicates with no outlet port. As shown in FIG. 2D, in the fourth switching position (fifty-four pulses), the plane valve 20A shuts the valve port l9C, only the valve port l9D is opened to the valve chamber 13, and the port A (inlet port) communicates with only the port C.

The pipe fittings are limited regarding being drawn toward the center of the valve body 20. The radius of the circle on which the pipe fittings are arranged is the pitch circle radius Pp of the through holes 11C, 11D. On the other hand, the valve ports 19C, 19D are biased toward the rotation center of the valve body 20 against the respective centers of the through holes 11C, 11D. Therefore, the pitch circle radius Pv of the valve ports 19C, 19D is smaller than that Pp of the through holes 11C, 11D. Accordingly, in comparison with a case that the pitch circle radius Pv is equal to the pitch circle radius Pp, the plane valve 20A can be arranged more inside in the radial direction, and correspondingly the driving torque required to rotate the valve body 20 can be reduced.

According to the above, as a magnet of the rotor 31 of the unit body 30, an expensive magnet having a large magnetic force and made of rare earth such as neodymium-iron is not needed, and a low-cost magnet such as ferrite can be used.

An amount of biasing of the valve ports 19C, 19D toward the rotation center is not limited by the communication openings 17D, 17E of the intermediate plate 17, but can be set to a proper value or a required value with high design flexibility.

In addition, as shown in FIG. 6, when the valve body 20 and the rotor 31 is connected to each other for conveying torque by engaging the projection 31A formed on a rotor 31 of a stepping motor 30 with the space between two projections 20F, 20G, a spring can be used for prevent the shake between two projections 20F, 20G and the projection 31A.

Figure 8:
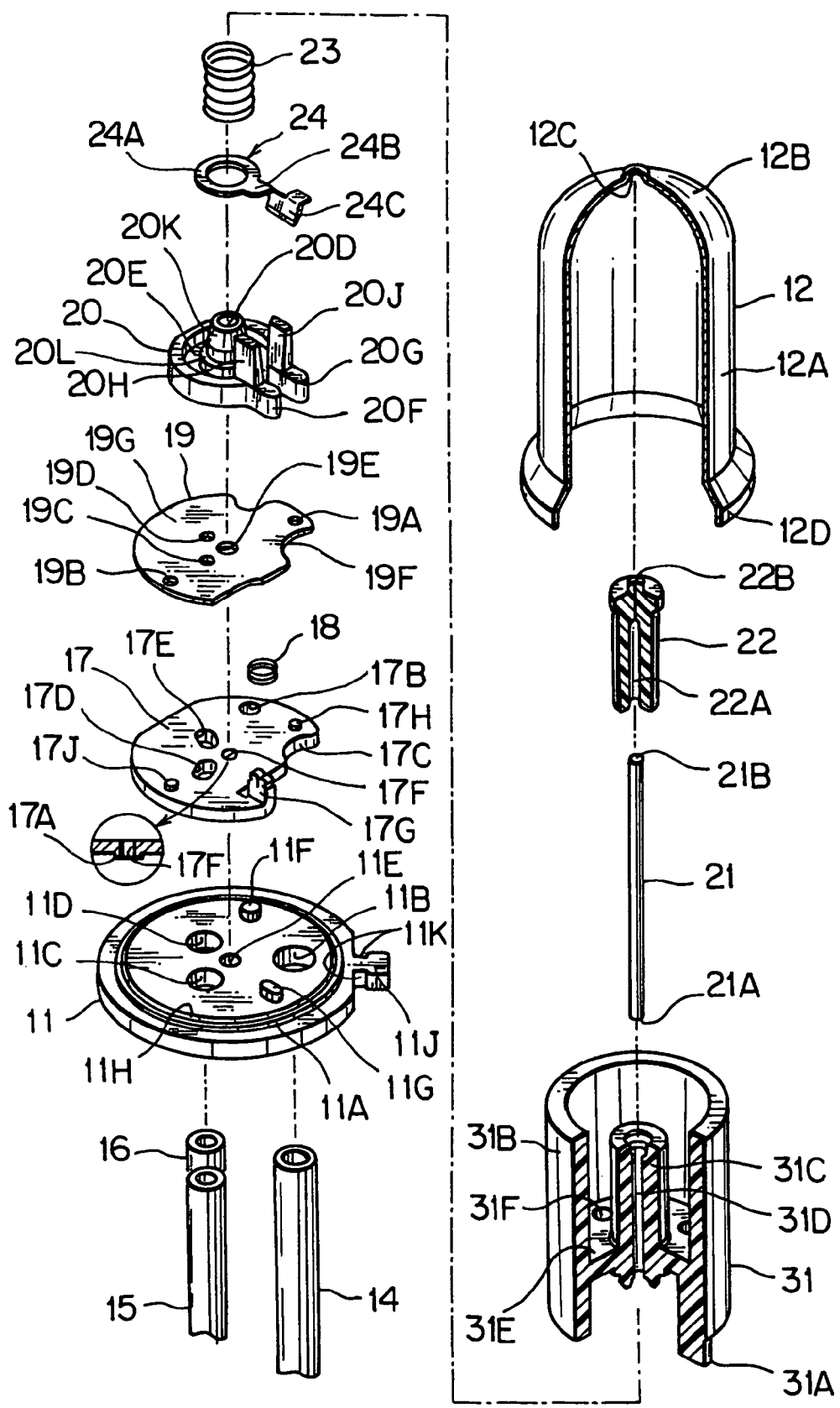
FIG. 8 is an exploded perspective view showing a main part of the electric switching valve according to a modified first embodiment.
Figure 9:
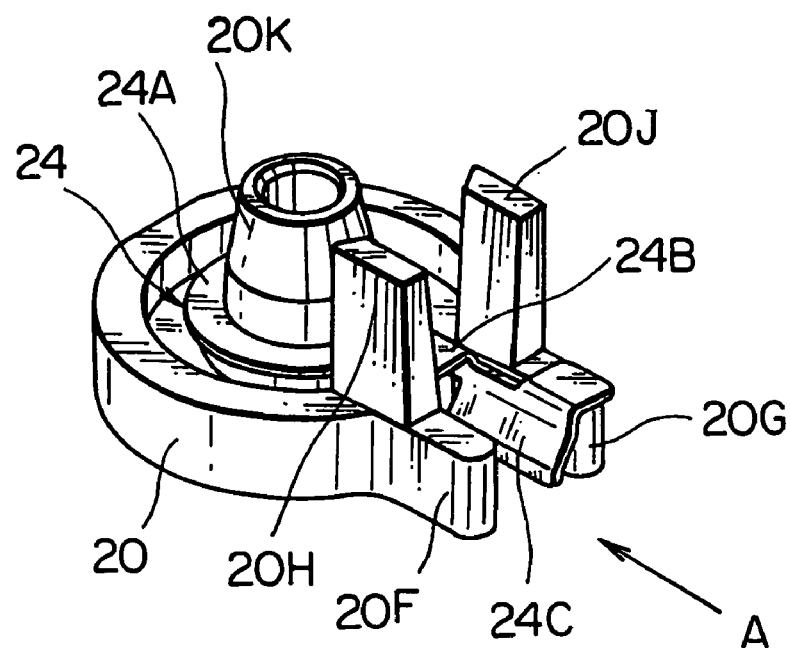
FIG. 9 is an enlarged perspective view showing a flat spring structure of FIG. 8 fitting into the valve body.

Namely, as shown in FIG. 8, a ring 24A of a flat spring structure 24 disposed between the valve body 20 and the pressure spring 23 is fitted into the tapered guiding shaft 20K of the valve body 20 to contact a step 20L on a base of the valve body 20. Then, as shown in FIG. 9, an extension 24B extended from the ring 24A in a radial direction thereof is disposed between two guiding pieces 20H, 20J of the valve body 20, and a spring piece 24C curved at a distal end of the extension 24B is disposed along an inner sidewall of the projection 20G.

Figure 10:
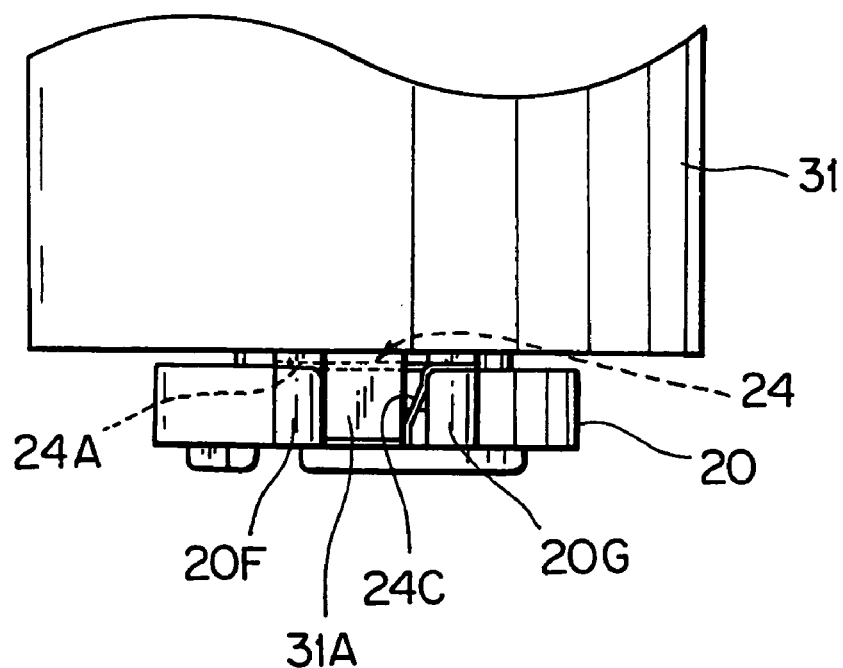
FIG. 10 is an enlarged front view from an arrow A of FIG. 9 showing the 5 valve body and a rotor of a stepping motor connected to each other for conveying torque.
Figure 11:
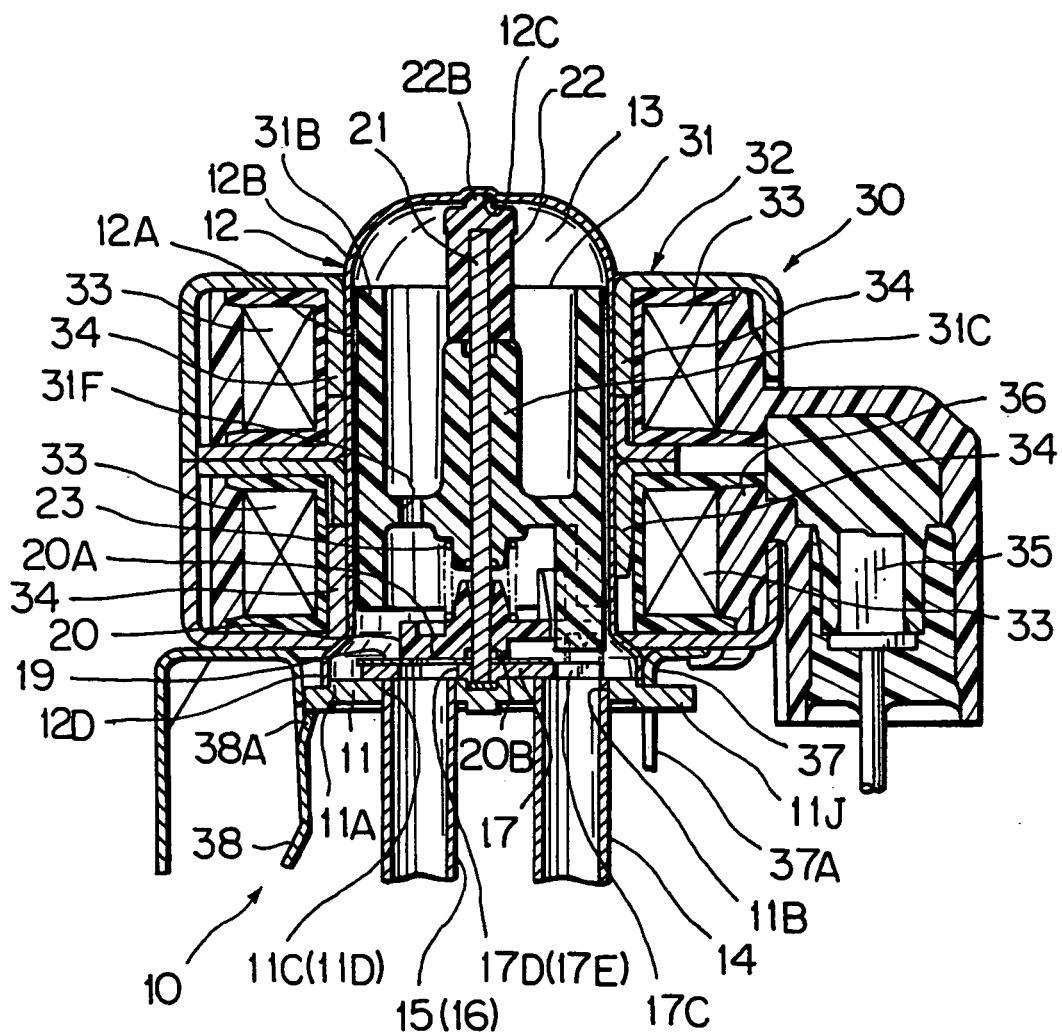
FIG. 11 is a sectional view showing a second embodiment of the electric switching valve according to the present invention.
Figure 14:
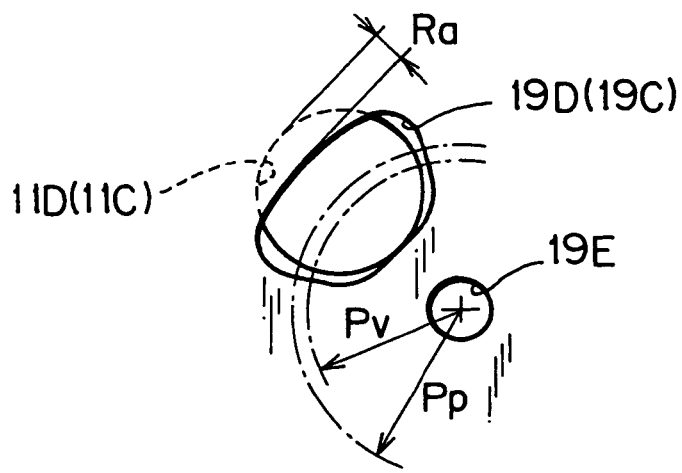
FIG. 14 is an enlarged plan view showing a positional relationship between through holes and valve ports of the electric switching valve in the 15 second embodiment.

According to the above, while the flat spring structure 24 is attached to the valve body 20, the projection 31A of the rotor 31 of the stepping motor 30 is engaged with the space between two projections 20F, 20G of the valve body 20. Then, as shown in FIG. 10, the spring piece 24C presses the projection 31A of the rotor 31 against the inner sidewall of the 20F. Therefore, the shake between the projections 20F, 20G and the projection 31A is absorbed. Resultingly, the valve body 20 and the rotor 31 are accurately and synchronously rotated and a shaking noise is reduced.

Specific Constitution of a Second Preferred Embodiment of an Electric Switching Valve According to the Present Invention Next, an electric switching valve according to a second embodiment of the present invention will be explained with reference to FIGS. 11 to 14. In FIGS. 11 to 14, identical elements corresponding to those in FIGS. 1 to 7 will be designated by identical reference numerals and will not be explained.

Figure 13:
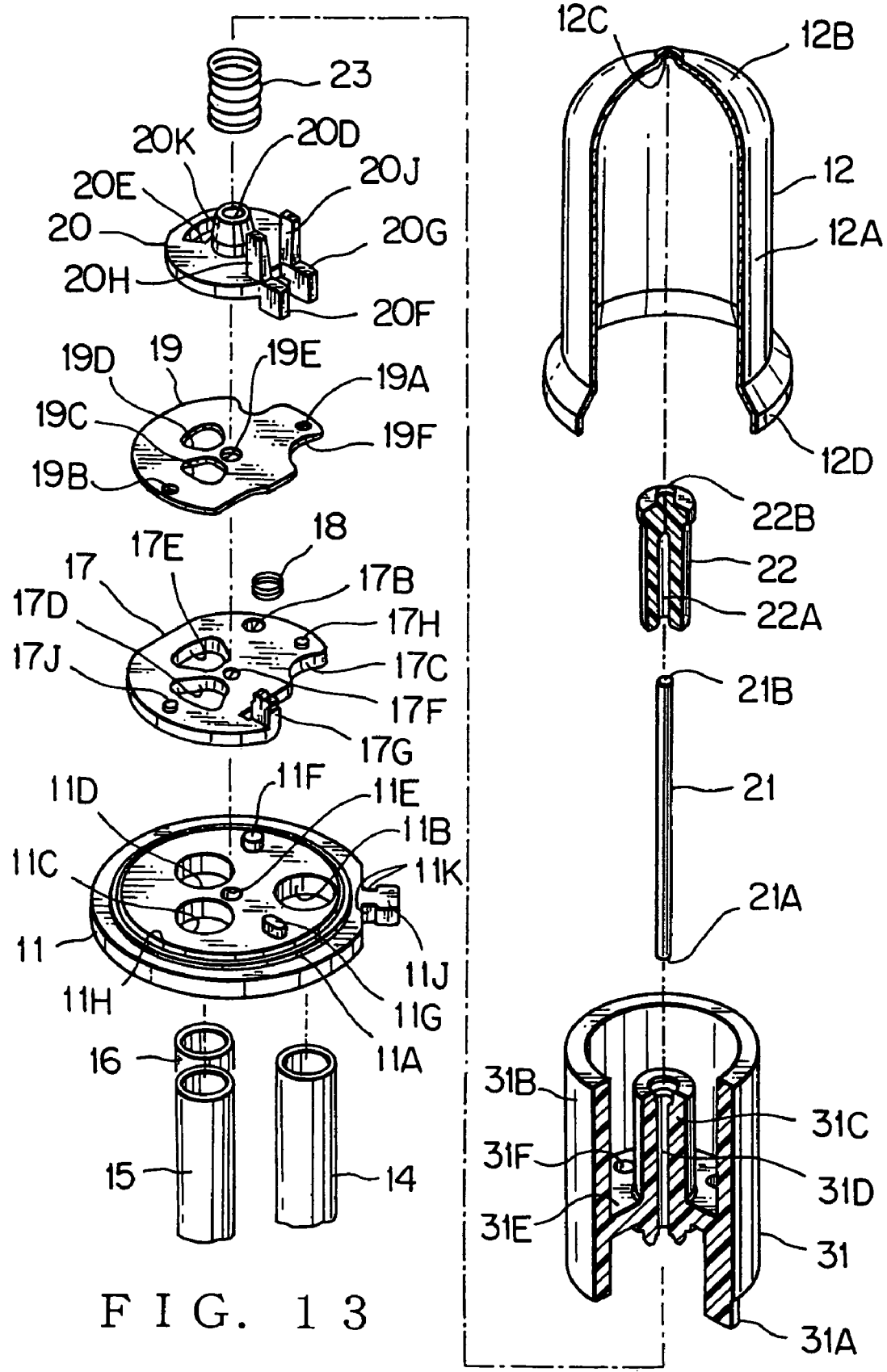
FIG. 13 is an exploded perspective view of a main part of the electric switching valve in the second embodiment.

According to the second embodiment, as shown in FIG. 13, each of the valve ports 19C, 19D formed by etching the valve seat 19 has a fan shape arranged around the rotation center of the valve body 20. As shown better in FIG. 14, the pitch circle radius Pv of the valve ports 19C, 19D is smaller than a pitch circle radius Pp of the through holes 11C, 11D. Outer peripheries of the valve ports 19C, 19D are biased at a length Ra toward the rotation center in the radial direction against the outer peripheries of the through holes 11C, 11D.

As shown in FIGS. 12A to 12C, the plane valve 20A of the valve body 20 is a fan-shape corresponding to shapes and arrangements of the valve ports 19C, 19D, and shuts or opens the valve ports 19C, 19D respectively corresponding to the rotation of the valve body 20.

Accordingly, like the electric switching valve of the first embodiment, in the electric switching valve of the second embodiment, a driving torque required for rotating the valve body 20 is also reduced in comparison with the case that the pitch circle radius Pv of the valve ports 19C, 19D is equal to the pitch circle radius Pp of the through holes 11C, 11D.

An amount of biasing of the valve ports 19C, 19D toward the rotation center is not limited by the fan-shaped communication openings 17D, 17E of the intermediate plate 17, but can be set to a proper value or a required value with high design flexibility. In addition, the valve ports 19C, 19D can be formed in an arc shape concentric with the rotation center of the valve body 20. Either shape can cope with mass-production.

According to the second embodiment, the valve body 20 is rotated to three switching positions by a divisional rotary driving of the unit body 30. As shown in FIG. 12A, in a first switching position (zero pulse=start position), the plane valve 20A shuts the valve port 19D, only the valve port 19D is opened to the valve chamber 13, and the port A (inlet port) communicates with the port B. As shown in FIG. 12B, in the second switching position (twenty pulses), the plane valve 20A shuts the valve port 19C, only the valve 19D is opened to the valve chamber 13, and the port A (inlet port) communicates with only the port C. As shown in FIG. 12C, in the third switching position (forty pulses), the plane valve 20A is apart from both the ports 19C and 19D, which are opened to the valve chamber 13, and the port A (inlet port) communicates with two outlet ports (ports B and C).

Incidentally, like the electric switching valve of the first embodiment, 25 the spring piece 24C of the flat spring structure 24 disposed between the valve body 20 and the pressure spring 23 can be used for absorbing the shake between the projections 20F, 20G and the projection 31A.

In this case, without explaining in detail using figures, for disposing the extension 24B of the flat spring structure 24 between the guiding pieces 20H, 20J of the valve body 20, the spring piece 24C is disposed along the inner sidewall of the projection 20G by fitting the ring 24A of the flat spring structure 24 into the tapered guiding shaft 20K of the valve body 20 to contact the step 20L on the base of the valve body 20.

In this state, by engaging the projection 31A of the rotor 31 of the stepping motor 30 with the space between two projections 20F, 20G of the valve body 20, the shake between the projections 20F, 20G and the projection 31A is absorbed. Resultingly, the valve body 20 and the rotor 31 are accurately and synchronously rotated and a shaking noise is reduced.

First Example Using the Electric Switching Valve According to the First and Second Preferred Embodiments of the Present Invention Next, a first example using the first and second preferred embodiment of the present invention will be explained with reference to FIG. 15.

FIG. 15 shows a schematic refrigerant circuit diagram of a refrigerator showing the first example using the electric switching valve according to the first and the second embodiments of the present invention. This refrigerant circuit of the refrigerator includes a compressor 51, a condenser 52, an expansion valve (or a capillary tube) 53, and an evaporator 54. In the electric switching valve 10, an inlet port A is connected to an exhaust pipe of the compressor 51, an outlet port B is connected to the condenser 52, and an outlet port C is connected to a bypass 55.

In a normal operation period, the electric switching valve 10 is located in a switching position where the inlet port A communicates with the outlet port B. In this case, the refrigerant flows through the compressor 51, the condenser 52, the expansion valve 53, the evaporator 54, and the compressor 51 sequentially as a normal refrigerating cycle.

In a defrosting period, the electric switching valve 10 is located in a switching position where the inlet port A communicates with the outlet port C. In this case, the refrigerant flows through the compressor 51, the bypass 55, the evaporator 54, and the compressor 51 sequentially. The refrigerant in high temperature and high temperature flows through the evaporator 54 to defrost the evaporator 54.

Second Example Using the Electric Switching Valve According to the First and Second Preferred Embodiments of the Present Invention Next, a second example using the first and second preferred embodiment of the present invention will be explained with reference to FIG. 16.

FIG. 16 is a schematic refrigerant circuit diagram of a freezer and a refrigerator showing the second example using the electric switching valve according to the first and second embodiment of the present invention. This refrigerant circuit diagram includes a compressor 61, a condenser (heatsink) 62, a capillary tube for freezer (CTF) 63, a capillary tube for refrigerator (CTR) 64, an evaporator for freezer 65, an evaporator for refrigerator 66, and an electric switching valve (electric three way valve) 67. The inlet port A, the outlet port B, and the outlet port C of the electric switching valve 10 are respectively connected to a downstream of the condenser 62, the capillary tube for freezer 63, the capillary tube for refrigerator 64.

When both of the freezer and the refrigerator are cooled down, the electric switching valve 67 is in the first position where the inlet port A communicates with both of the outlet ports B and C. In this case, the refrigerant flows through the compressor 61, the condenser 62, the capillary tube for freezer 63, the evaporator for freezer 65, and the compressor 61 sequentially, and simultaneously also flows through the compressor 61, the condenser 62, the capillary tube for refrigerator 64, the evaporator for refrigerator 66, the evaporator for freezer 65, and the compressor 61 sequentially. Resultingly, when starting up, an effect of cooling in a full driving is secured for the amount of the evaporation load of the evaporator for freezer 65 and the evaporator for refrigerator 66.

When the freezer has a priority to be cooled down, the electric switching valve 67 is in the second position where the inlet port A communicates with the outlet port B. In this case, the refrigerant flows through the compressor 61, the condenser 62, the capillary tube for freezer 63, the evaporator for freezer 65, and the compressor 61 sequentially. Resultingly, the freezer is operated and the refrigerator is stopped operating.

When both of the freezer and the refrigerator are stopped, the electric switching valve 67 is in the third switching position where the inlet port A communicates with no outlet port and all ports are closed. In this case, high temperature and high pressure refrigerant is prevented from flowing into neither the evaporator for freezer 65 nor the evaporator for refrigerator 66 for elongating a period of stopping time.

When the refrigerator has a priority to be cooled down, the electric 25 switching valve 67 is in the fourth switching position where the inlet port A communicates with the outlet port 4. In this case, the refrigerant flows through the compressor 61, the condenser 62, the capillary tube for refrigerator 64, the evaporator for refrigerator 66, the evaporator for freezer 65, and the compressor 61 sequentially.

INDUSTRIAL APPLICABILITY

As it is obvious by the first and second embodiments explained above, according to an electric switching valve of this invention, when valve ports formed on a valve seat are biased toward a rotation center of a valve body against through holes formed on a bottom cover, an amount of biasing can be adjusted to a proper value or a required value with high design flexibility without restrictions caused by communication openings formed on an intermediate plate.

Further, when at least one of pipe fittings of the valve ports is biased toward the rotation center of the valve body, since the pitch circle radius of the valve port is smaller than that of the pipe fittings, a driving torque required for rotating the valve body can be reduced.

Further, each of the valve ports biased toward the rotation center against the centers of the pipe fittings may be for example in an arc shape such as a fan shape. Such an arc shape can accept a large amount of flow.

Further, using an etched plate as the valve seat improves a design flexibility of the valve seat, and improves accuracy of sizes of parts, surface flatness and smoothness.

In an example of a detailed configuration, the inlet port is always communicates with the valve chamber, and two outlet ports separated from each other in a rotational direction of the valve body. Connections between the inlet port and the outlet ports are switched by the rotational positions of the valve body. Two outlet ports are biased toward the rotation center of the valve body against the centers of the pipe fittings.

In such a configuration of the electric switching valve, since a pitch circle radius of the two outlet ports is smaller than the pitch circle radius of the pipe fittings, the driving torque for rotating the valve body can be reduced.

Further, in another detailed configuration, a stepping motor works as an electric actuator. A rotor of the stepping motor is engaged with the valve body for conveying torque. The valve body having a center hole, with which a center shaft is rotatably engaged, works as a rotation center. Since the center hole is tapered, the electric switching valve is assembled easily, the valve body is allowed to oscillate about the center shaft, and the valve body is pressed by a spring against an opening wall of the valve port.

In such a configuration, oscillating of the valve body can compensate parallelism and perpendicularity deviations of the valve seat and the valve body against the center shaft. Further, this oscillating reduces a valve locking risk of the valve body by catching dust.

In a case that the rotor is engaged with the valve body by inserting the projection of the rotor into between the projections of the valve body for conveying torque, setting a spring mounted between one of the two projections of the valve body and the projection of the rotor so as to press the other projection toward the rotational direction of the valve body reduces a shaking between the two projections of the valve body and the projection of the rotor. Thereby, the valve body and the rotor are rotated synchronously and precisely. Further, a noise caused by the shaking is reduced.

In another detailed configuration, a stepping motor works as the electric actuator. A projection is formed on the bottom of the valve chamber as a stopper for stopping a rotor of the stepping motor. A buffer coil spring is attached to the projection.

In this configuration, since the buffer coil spring buffers an impact when the stopper collides, a collision sound is reduced.

The invention claimed is:

1. An electric switching valve comprising,
a valve chamber having a plurality of valve ports opened on a flat bottom wall thereof,
a valve body disposed rotatably in the valve chamber, slidably contacting the bottom wall of the valve chamber at an end wall thereof, and switching connections between the valve ports corresponding to a rotational position thereof, and
an electric actuator for rotating the valve body,
wherein the bottom wall of the valve chamber includes a laminated structure having a bottom cover to which pipe fittings are connected, a valve seat on which the valve ports are opened and to which the valve body slidably contacts at an end wall thereof, an intermediate plate having communication openings, for connecting the pipe fittings to the valve ports, interposed between the bottom cover and the valve seat,
wherein at least one of the valve ports is biased in a radial direction of the rotating valve body against the center of the corresponding pipe fitting,
wherein a stepping motor works as the electric actuator, of which rotor is engaged with the valve body for conveying torque,
wherein a tapered center hole drilled on the valve body works as a rotation center with which a center shaft is rotatably engaged,
wherein the tapered center hole allows the valve body to oscillate about the center shaft,
wherein the valve body is pressed by a spring against an opening wall of the valve port.

2. The electric switching valve as claimed in claim 1, wherein the rotor of the stepping motor is engaged with the valve body by inserting a projection of the rotor into between projections of the valve body for conveying torque,
wherein a spring mounted between one of the two projections of the valve body and the projection of the rotor presses the other projection toward the rotational direction of the valve body.

3. The electric switching valve as claimed in claim 1 or 2, wherein a stopping projection is formed on the bottom of the valve chamber as a stopper for stopping the rotor of the stepping motor,
wherein a buffer coil spring is attached to the stopping projection.

* * * * *

UNITED STATES PATENT AND TRADEMARK OFFICE
CERTIFICATE OF CORRECTION

| | | |
|---|---|---|
| PATENT NO. | : 7,204,271 B2 | |
| APPLICATION NO. | : 10/545712 | |
| DATED | : April 17, 2007 | |
| INVENTOR(S) | : Akira Kasai et al. | |

It is certified that error appears in the above-identified patent and that said Letters Patent is hereby corrected as shown below:

On the Title Page Item (22) after "Feb." delete "14" and insert therein --13--

Column 1, line 9 after "Feb." delete "14" and insert therein --13--

Signed and Sealed this

Twenty-sixth Day of June, 2007

JON W. DUDAS
*Director of the United States Patent and Trademark Office*